United States Patent [19]

Britton

[11] 4,352,022
[45] Sep. 28, 1982

[54] READING OF MARKS

[76] Inventor: Charles W. Britton, 301 Tavistock Dr., Medford, N.J. 08055

[21] Appl. No.: 63,736

[22] Filed: Aug. 6, 1979

Related U.S. Application Data

[63] Continuation-in-part of Ser. No. 675,628, Apr. 9, 1976, Pat. No. 4,228,952.

[51] Int. Cl.³ ............................................. G01N 21/86
[52] U.S. Cl. ..................................... 250/561; 271/8 A
[58] Field of Search ................ 250/561, 571; 271/8 A

[56] References Cited

U.S. PATENT DOCUMENTS 4,021,031  5/1977  Meihofer et al. ............... 250/561 X Primary Examiner—David C. Nelms
Assistant Examiner—Darwin R. Hostetter
Attorney, Agent, or Firm—Connolly and Hutz

[57] ABSTRACT

Marks on test answer sheets and the like are detected by scanning with fiber optic line-to-circle converter using a single photocell. Four to five rows of optical fibers each about 2 to about 3 mils thick make up the fiber optic line, and the fiber optic "circle" is an arc no greater than about 95% of a circle. Scanning can be compensated for flaws in the optics and for poor response when photocell begins scanning the arc. Sheets are fed in spaced sequence, the feed is deactuated momentarily and then reactuated in synchronism with the scanning. Electrically operated clutch-brake assembly with spring-carried clutch plate makes good synchronizer particularly when clutch is opened for not over 0.1 second and is closed by a current pulse at a voltage substantially greater than used for holding it closed.

3 Claims, 21 Drawing Figures

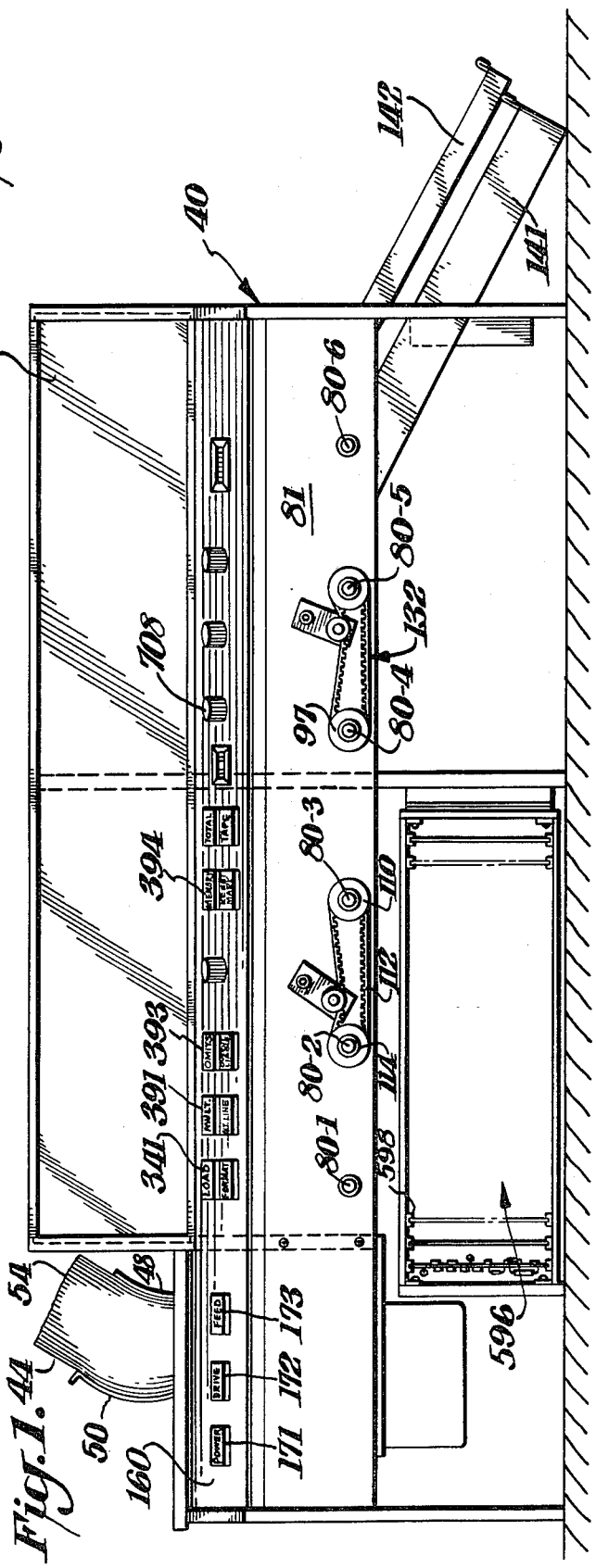

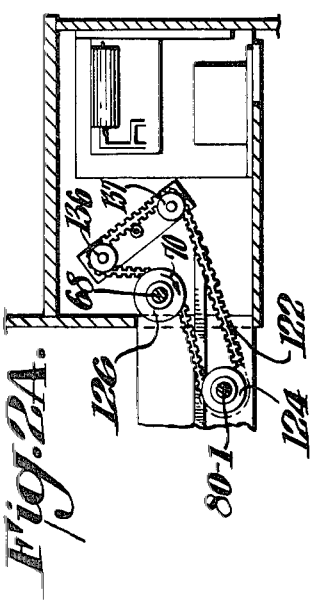
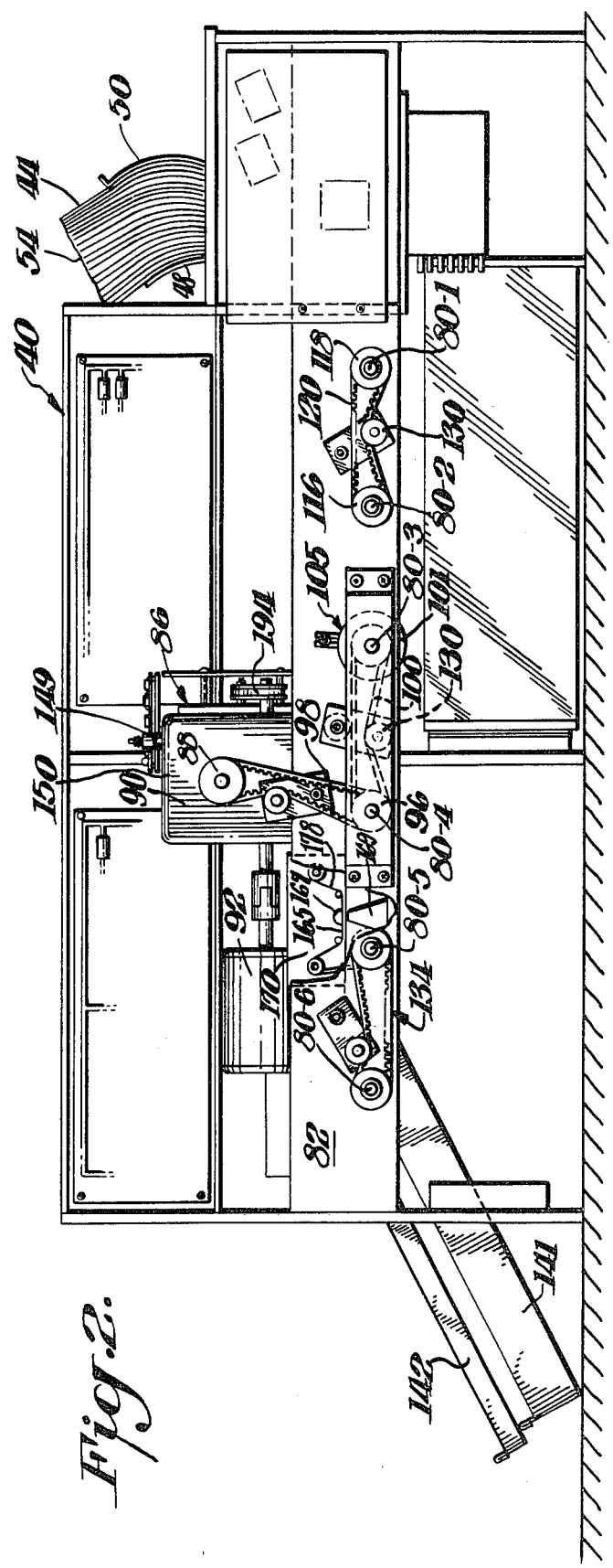

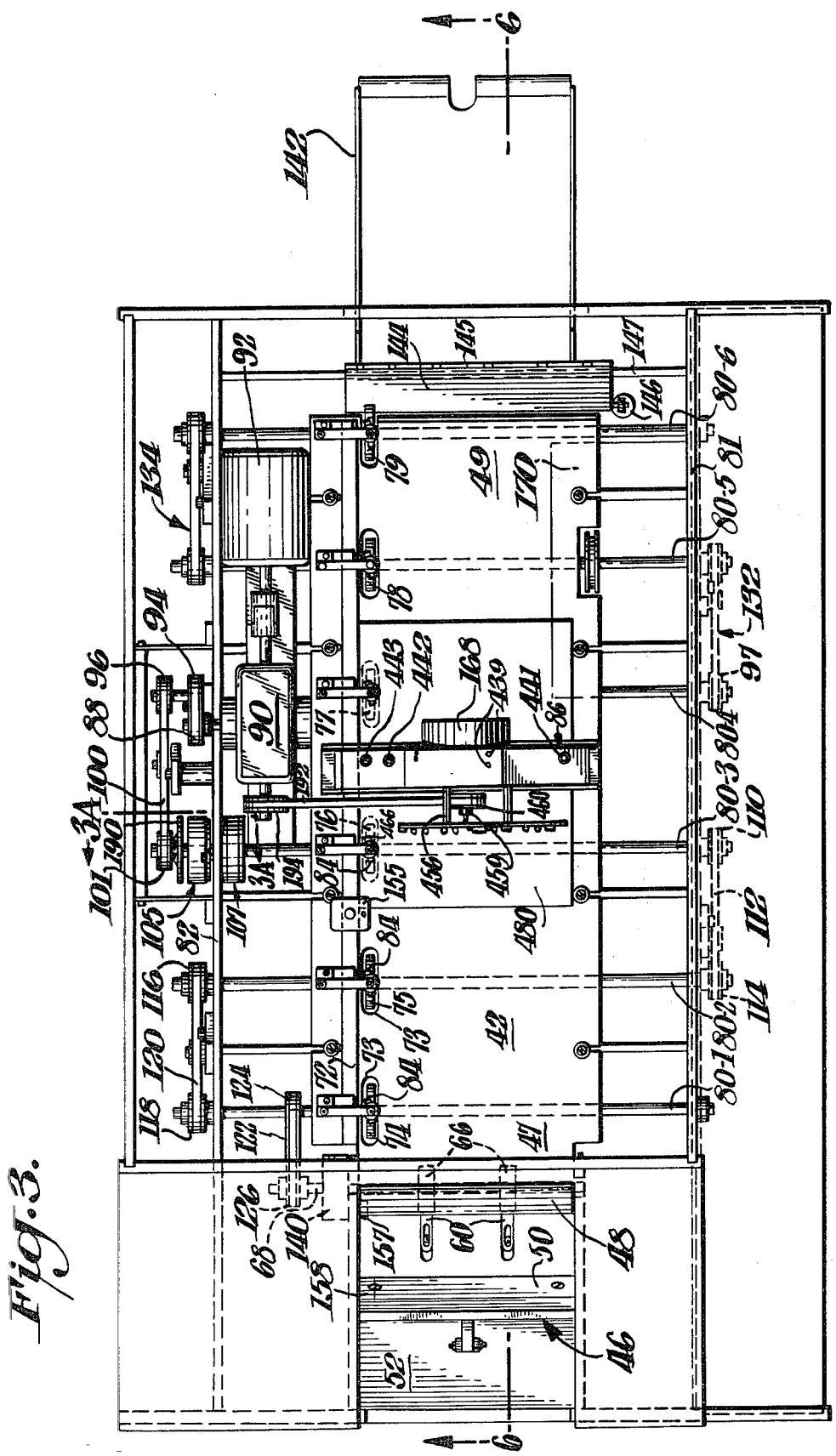

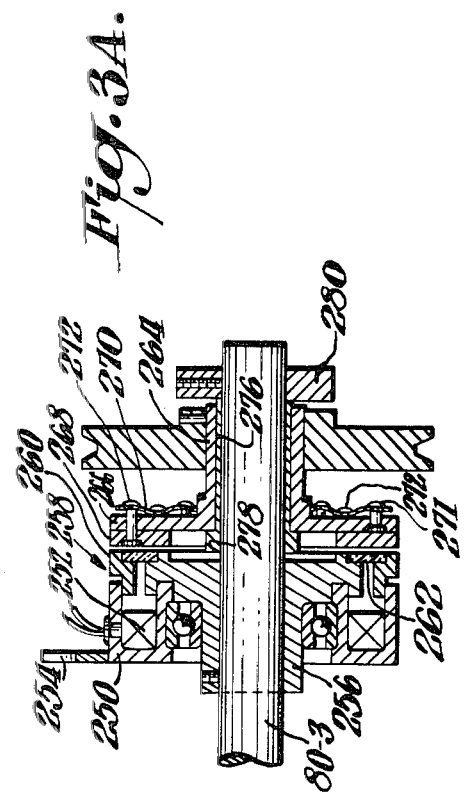
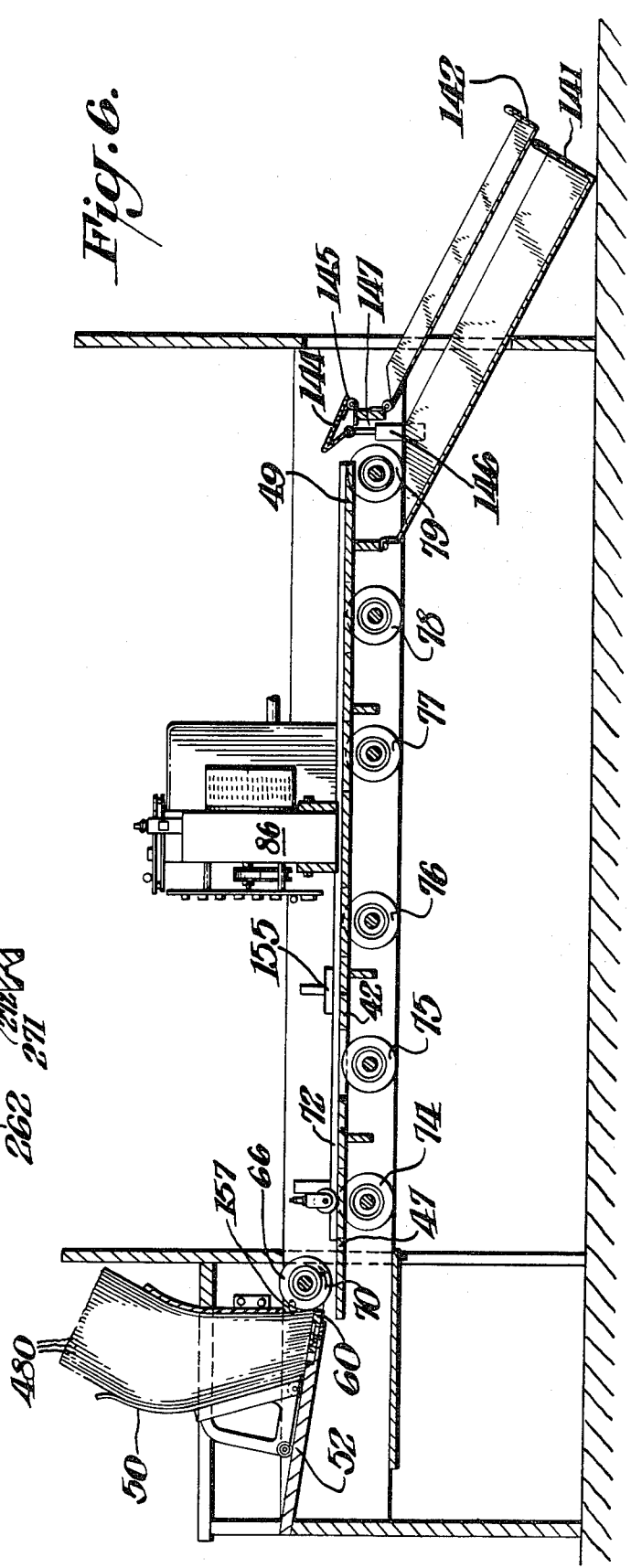

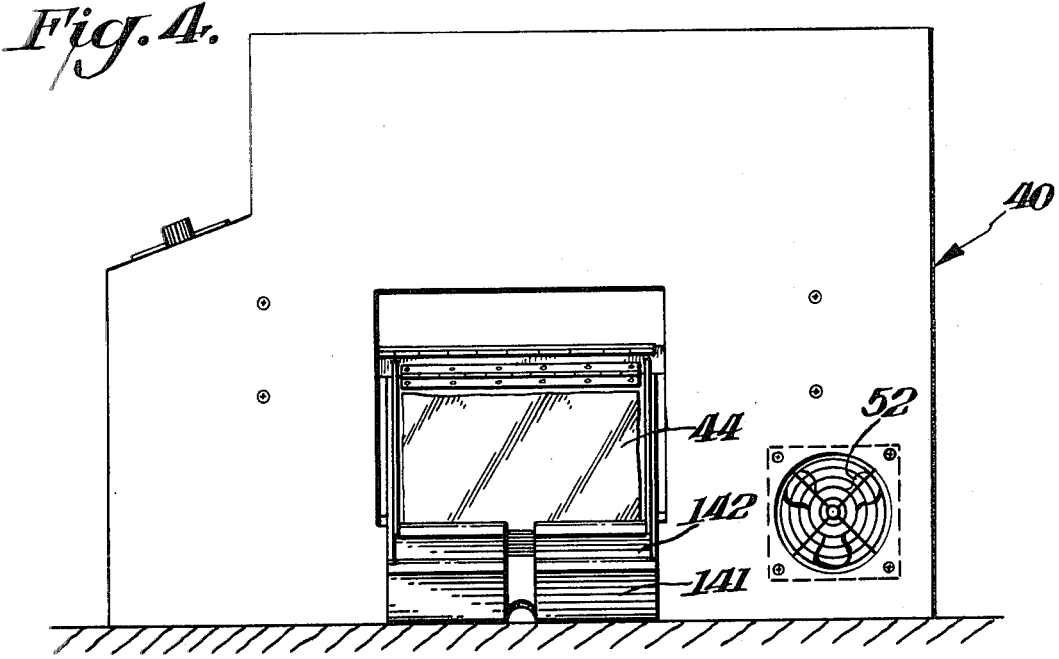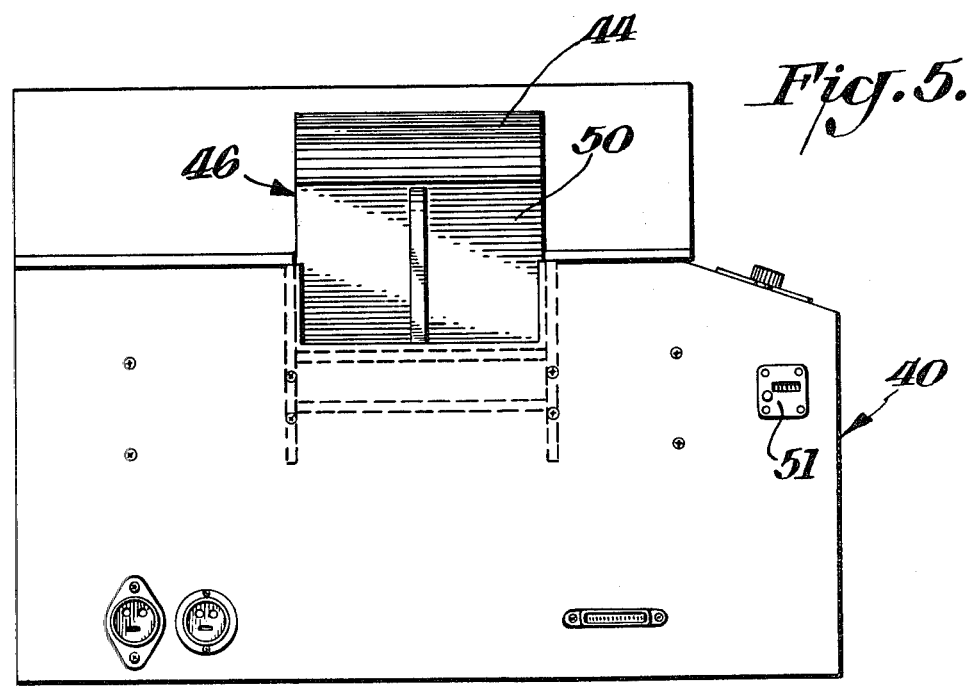

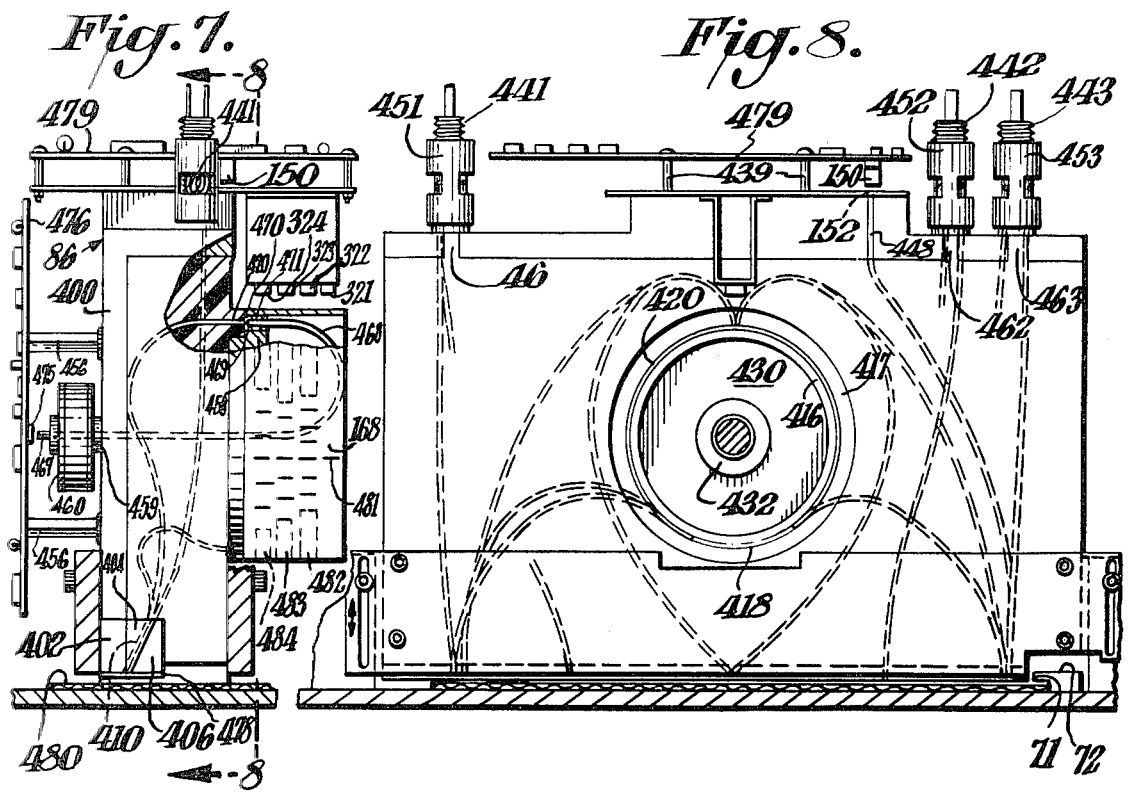
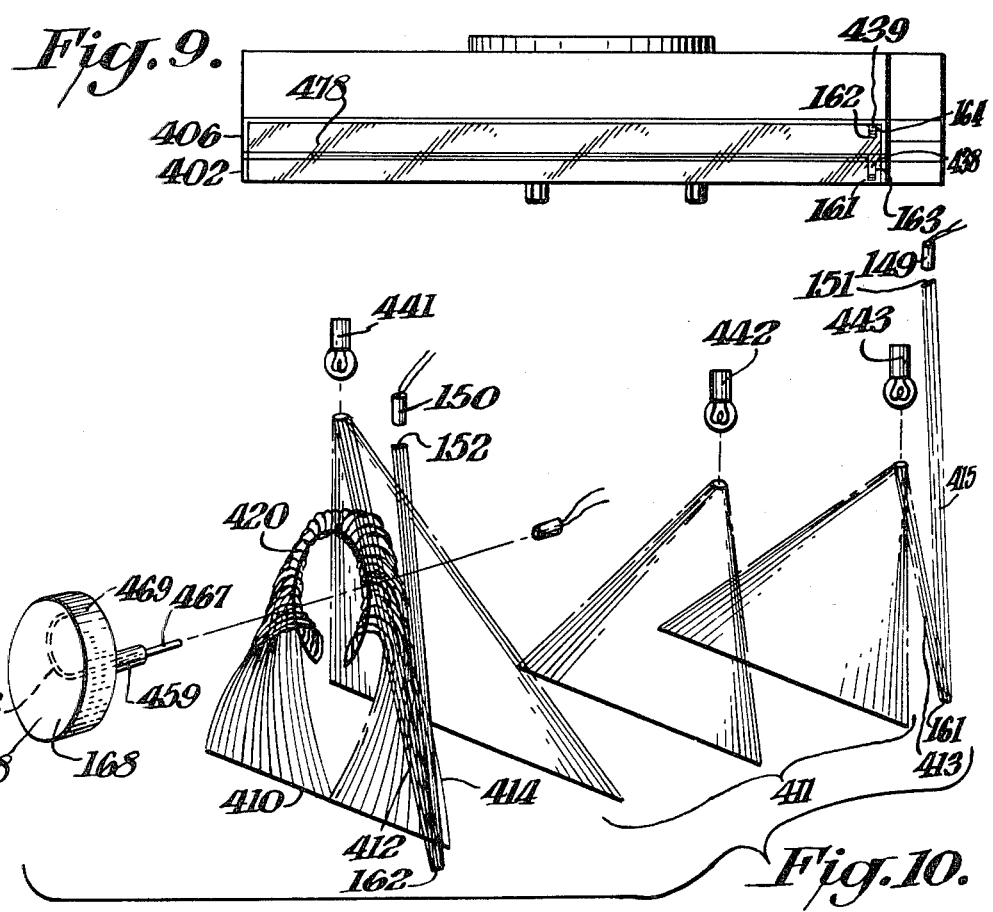

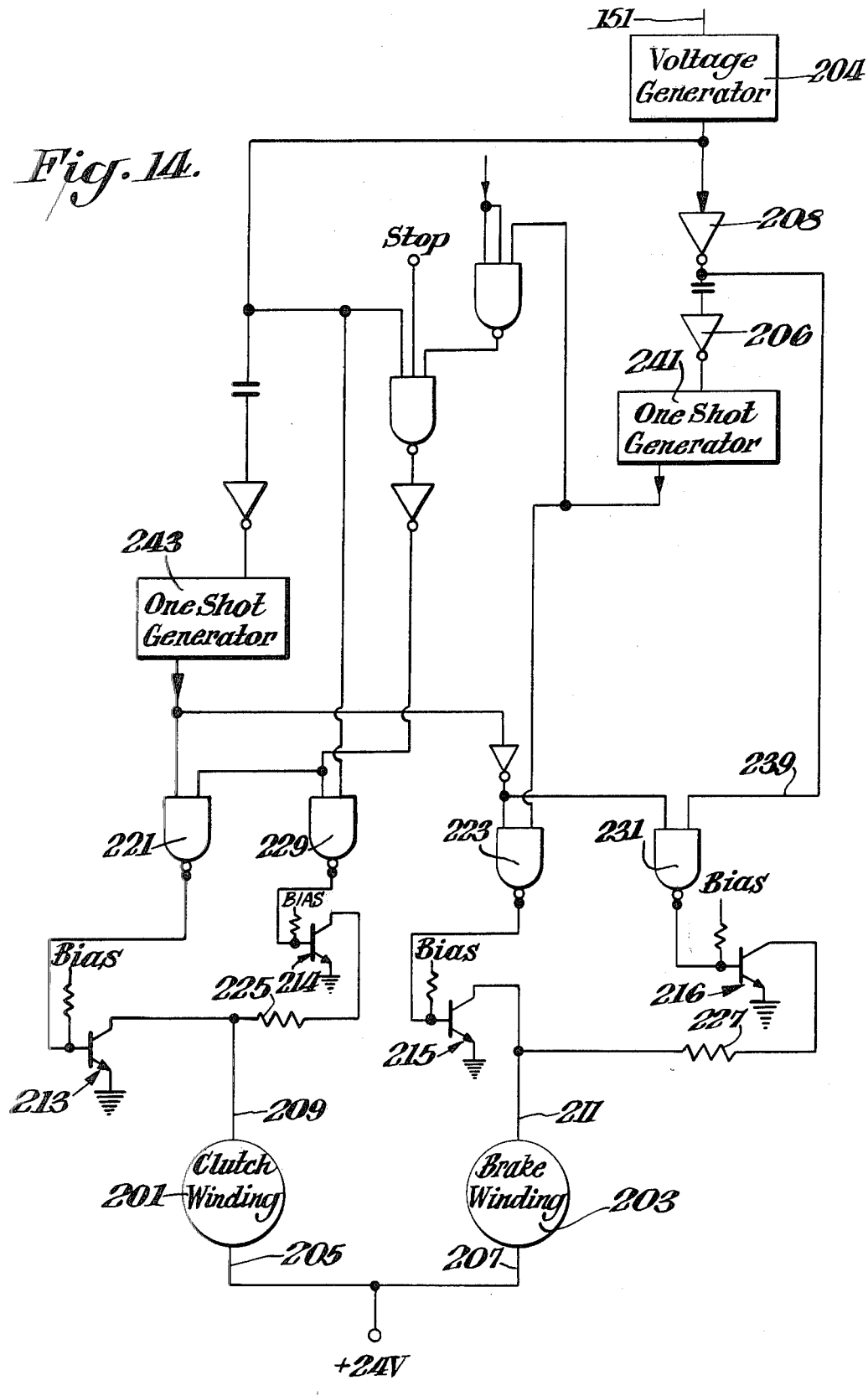

READING OF MARKS

This application is a continuation-in-part of patent application Ser. No. 675,628 filed Apr. 9, 1976 now U.S. Pat. No. 4,228,952.

The present invention relates to the automatic reading of sheets on which marks have been applied. Prior equipment for similar purposes is described in U.S. Pat. Nos. 2,672,288, 2,926,982, 2,938,666, 3,190,414, 3,249,692, 3,255,357, 3,272,063, 3,282,666, 3,284,929, 3,325,594, 3,347,649, 3,354,319, 3,401,232, 3,408,482, 3,411,011, 3,418,456, 3,464,265, 3,487,560, 3,487,561, 3,505,526, 3,518,440, 3,519,116, 3,520,622, 3,533,657, 3,538,312, 3,549,895, 3,559,555, 3,574,263, 3,585,396, 3,610,891, 3,621,133, 3,636,317, 3,643,348, 3,676,690, 3,706,874, 3,737,628, 3,737,629, 3,744,048, 3,786,238, 3,793,472, 3,800,439, 3,836,958, 3,845,280, 3,868,514, 3,896,291, 3,896,292, 3,896,293, 3,896,294, 3,900,961, 3,904,110, 3,932,022, 4,052,594, and 4,122,997, all of which are of record in the parent application.

Among the objects of the present invention is the provision of improved apparatus and processes for automatically reading sheets, particularly for determining the location of pencil marks that have been applied to them.

The foregoing as well as additional objects of the present invention are more fully explained in the following description of several of its exemplifications, reference being made to the accompanying drawings wherein:

FIG. 1 is a front elevation, with parts broken away, of an automatic mark reader representative of the present invention;

FIG. 1A is an elevation view on a scale larger than that of FIG. 1, of a display panel of the apparatus of FIG. 1;

FIG. 2 is a rear elevation, with parts broken away, of the reader of FIG. 1;

FIG. 2A is a sectional detail view of a portion of a drive connection in the apparatus of FIGS. 1 and 2;

FIG. 3 is a plan view of the apparatus of FIGS. 1 and 2, with parts removed to better show the interior;

FIG. 3A is a detail sectional view, taken along line 3A—3A of FIG. 3;

FIGS. 4 and 5 are side elevations of the apparatus of FIG. 1, taken from its left and right sides, respectively;

FIG. 6 is a sectional view of the construction of FIG. 3, taken along line 6—6;

FIG. 7 is an enlarged partly broken-away detail view of a scanning head seen in FIG. 6;

FIG. 8 is a partly sectional view of the scanning head of FIG. 7, taken along line 8—8;

FIG. 9 is a bottom view of the head of FIGS. 7 and 8, with some of its attachments removed;

FIG. 10 is an exploded somewhat diagrammatic representation of the optical features of the head of FIGS. 7, 8 and 9;

FIG. 11 is a plan view of an answer sheet suitable for use with the apparatus of FIGS. 1 through 6;

FIG. 12 is a plan view of a load sheet suitable for setting the apparatus to automatically score test sheets;

FIG. 14 is a block diagram illustrating the scan synchronizing of the present invention.

Figure 11:
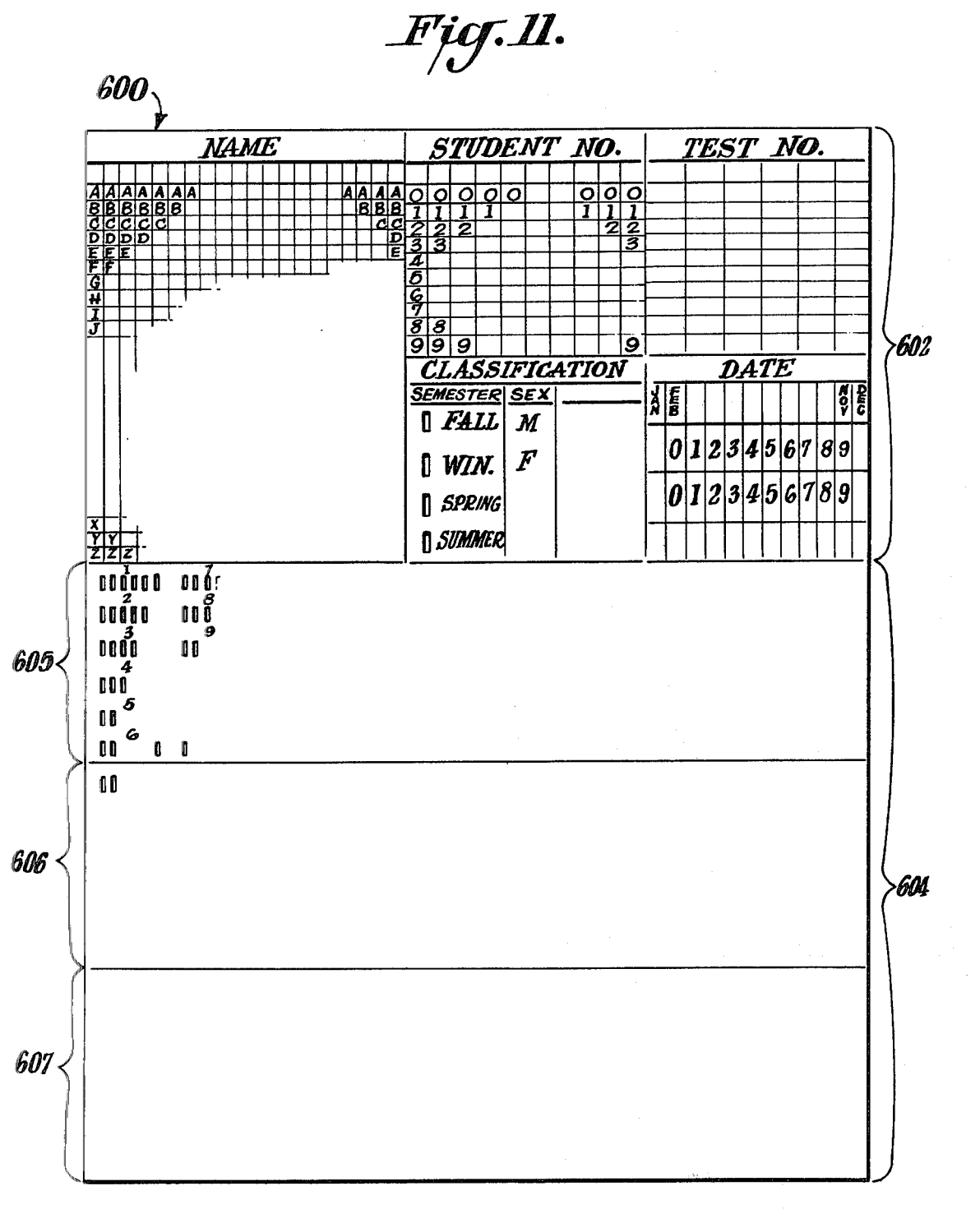
Figure 13:
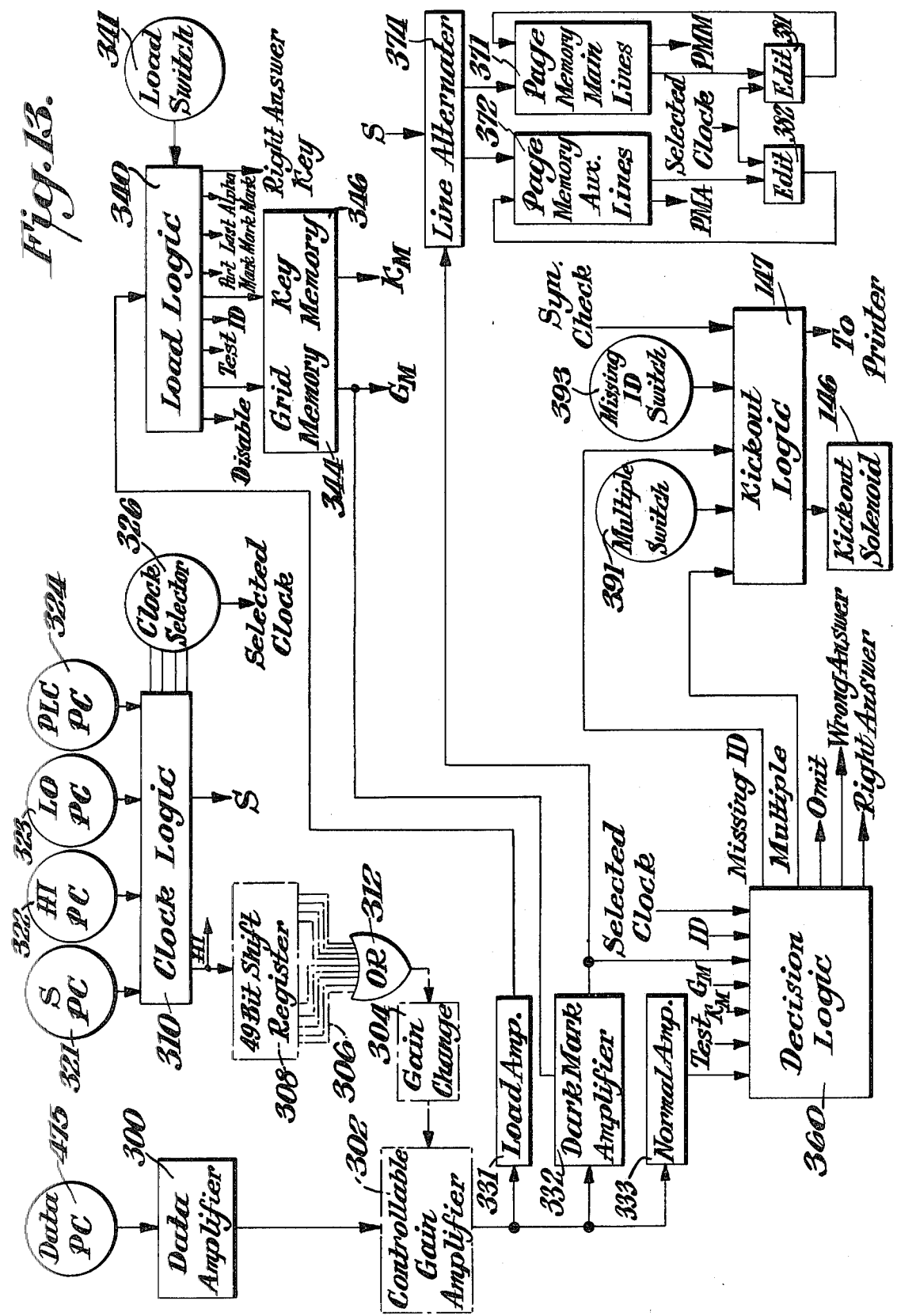
FIGS. 13 and 13A are block diagrams illustrating the reading and scoring operations carried out by the apparatus.

Many scholastic examinations are of the multiple-choice type taken by examinees who mark their answers to individual examination questions in pencil on standard answer sheets such as shown in FIG. 11. These sheets are generally 8½ by 11 inches in size, which is a standard size, with guide blocks printed on them in a non-carbon ink such as blue ink, to show where the pencil lines are to be applied. Information such as the identification of the examinee can also be applied to such sheets by additional pencil markings in other guide blocks. The pencil marks are not necessarily uniformly applied so that they usually differ from each other, as in intensity, length, width, exact location with respect to a guide block, and the presence or absence of erasure. In some instances two or more choices of answer are marked where only one answer is proper, and such conditions are to be distinguished from those in which multiple answers to one question are proper.

According to the present invention the foregoing pencil markings are accurately read by an assembly having a light-fiber line-to-circle converter that contains a linear array of four to five rows of light-conducting fibers, each fiber being about two to about three mils thick, and the fibers merging from said linear array to a circular array that is scanned by a single photocell. A single scan across the circular array is sufficient to have the photocell detect a pencil mark that runs generally transverse to the linear array of fibers, so the reading of a sheet is effected expeditiously as well as rapidly.

Reading of the marks by light reflected from the sheet surface is much more dependable than by light transmitted through the sheet from back to front, and does not require a very expensive paper. For such reflective reading it is desirable to illuminate by artificial light the portion of the sheet surface exposed to the scanning. A very effective arrangement providing a uniform level of illumination for the scanning is through the use of a separate set of elongated light-conducting fibers having one of their ends illuminated and the other ends aligned generally parallel to the linear array of scanning fiber ends.

Excellent results have been obtained with the fiber optic illumination when the illumination fibers have their parallel ends lying generally in a plane inclined at an angle between about 15° and about 25° with respect to a plane perpendicular to the surface being scanned. A 20° inclination with the light-emitting fiber ends pointed toward the direction from which the sheet approaches, is particularly effective. Having the illuminating fibers the same thickness as the reading fibers and in a number of rows equal to the number of rows of reading fibers is also quite helpful, as is the alignment of the reading ends of the reading fibers in a plane generally parallel to and adjacent the inclined plane of the illuminating ends of the illuminating fibers. A spacer sheet about 1 or 2 mils thick can be fitted between the rows of the reading ends of the reading fibers on the one side, and the rows of the illuminating ends of the illuminating fibers on the other side, to improve their alignment.

The feeding of the sheets to be read past the scanning means must be carefully synchronized with the scanning. To this end a sheet-transporting means is arranged to move successive sheets to a predetermined synchronizing position, hold each one stopped there at least a predetermined time, and then to propel the held sheet across the scanner in synchronism with the transverse passes of the scanner. By arranging for all sheets to be thus propelled from a stopped condition that is maintained long enough to assure that the sheet and the sheet-transporting means have both come to complete rest, it is also assured that the successively propelled sheets are in accurately reproducible relation to the scanning. A suitable stopping time for high speed scanning is the time taken by two to three scanning cycles, or about 0.05 to about 0.1 second.

The sheets being transported past the scanning sight should also be spaced from each other to further improve the reading. Such spacing is readily effected by having the transporting initiated with a sheet-contacting supply roller that has its rotation stopped after a sheet it supplies reaches a predetermined spacing position in its advance. Interrupting the rotation of the supply roller thus stops the next sheet, while the previously supplied sheet continues to advance in its feed path establishing a spacing between it and the next sheet.

Synchronizing is also improved by an electrically operated clutch-and-brake combination in the drive mechanism of the sheet-transporting means. An advancing sheet is thus accurately stopped by disengaging the clutch and engaging the brake of such a combination, as when the sheet reaches a predetermined synchronizing position. In response to a synchronizing signal from the scanner, the brake is disengaged and the clutch engaged to cause the stopped sheet to re-start at the instant needed to reach the scanner in a synchronized position.

Propelling the stopped sheet is also made more reproducible by engaging the clutch with a pulse of electric current at a voltage substantially higher than that used to keep the clutch engaged, as well as by using a clutch of the type that has a spring-carried clutch plate, and by arranging for the duration of the clutch disengagement to be limited to a time no greater than about 0.1 second.

Turning now to the drawings for a more complete explanation of the sheet-reading of the present invention, including the photoelectric cell and logic circuits, FIGS. 1 through 10 show the sheet-handling apparatus contained in a box-like housing 40 enclosing a bed 42 along which the sheets are fed from a stack 44 of sheets in a supply holder 46. The holder has a fixed inner plate 48 against which the stack is urged by a slidable outer plate 50 slidably held in a downwardly inclined trackway 52 and heavy enough to positively slide down the trackway moving the stacked papers before it against the inner plate 48. The papers in the stack are generally vertically positioned and the plates are shown as curved slightly to bow the papers so that their upper edges 54 lean forward ahead of their lower edges 56. This helps in determining with a photocell the presence of sheets in holder 46, as described more fully below.

At the front edge 58 of the track a set of forwardly projecting feed fingers 60 is positioned as extensions of the track, each finger adjusted to touch the yieldable periphery 64 of a supply roller 66. That periphery is preferably an elastomer such as silicone rubber or natural rubber or other synthetic rubber having a durometer of 40 to 60. The feed rollers rotate on a horizontal shaft 68 and as seen in FIG. 6 are so positioned that their peripheries also engage the lower portion of the leading sheet in the supply stack. Rotation of the feed rollers in the direction indicated by arrow 70 causes their peripheries to pull the leading sheet past the fingers 60 and propel it onto the adjacent portion 47 of bed 42.

Bed 42 is flat and of generally elongated form with a side wall 72 standing up along one side edge to help guide the fed sheets in their advancing movement from the longitudinal end 47 onto which it is fed, to the discharge end 49. Adjacent the side wall, drive slots 73 are cut in the bed to receive the upper portion of driven advancing rollers shown as a first set of three 74, 75 and 76, and a second set of three, 77, 78 and 79. Each of these advancing rollers is carried by a separate shaft 80-1, 80-2, 80-3, 80-4, 80-5 and 80-6 journaled in vertical panels 81, 82 within housing 40 at spaced locations along bed 42 and below it. The upper surface of each advancing roller is approximately tangent to the paper receiving surface of bed 42 and is engaged by a gripping pinch roller 84 spring biased against it so as to grip a sheet of paper between them and control its advance along the bed. The pinch rollers 84 for the first set of advancing rollers 74, 75 and 76 can be canted to one side slightly, as shown more clearly in FIG. 3, in order to help guide the sheet against side wall 72 and keep it against that wall as it is advanced on the bed under reading head 86. A shoulder 71 (FIG. 8) can be provided at the inside lower edge of wall 72 as by milling out some of that edge, to keep the edge of the advancing sheet from curling. The milling can be about 30 mils high and about $\frac{1}{8}''$ deep into the wall.

For better urging the sheet against the side wall, roller 74 can have smooth metallic peripheries and the gripping rollers elastomeric peripheries. Rollers 75, 76, 77, 78 and 79 desirably have lightly knurled metallic peripheries. The canting of the pinch rollers can be reduced by lengthening the distance between the feed discharge and the reading head shown at 86.

Operation of the feed and advancing rollers is from drive pulley 88 projecting from a gear box 90 mounted on a shelf within housing 40. A separate electric motor 92 can power the gear box, or the motor and gear box can share a common casing.

Pulley 88 is linked to a pulley 94 pinned to the shaft 80-4 that also carries advancing roller 77, which shaft further carries two more drive pulleys 96, 97. The linkage is through a timing belt 98 having internal teeth 99 that mate with corresponding teeth in the hubs of each of the linked pulleys, to keep them in synchronized rotation.

Pulley 96 is in turn linked by a similar timing belt 100 to a driven pulley 101 journaled on shaft 80-3 that carries roller 76. An electrically controlled clutch 105 transmits rotation from pulley 101 to the shaft when the clutch is energized. An electrically controlled brake 107 is also mounted on that shaft to arrest its rotation when the brake is actuated.

Shaft 80-3 also carries a drive pulley 110 by which it is linked through another timing belt 112 to a driven pulley 114 on one end of shaft 80-2. The other end of shaft 80-2 carries a drive pulley 116 which drives a driven pulley 118 on shaft 80-1 through a further timing belt 120, and shaft 80-1 in turn drives feed shaft 68 by means of yet another timing belt 122 coupled between a drive pulley 124 on shaft 80-1 and a driven feed pulley 126 journaled on shaft 68. Take-up rollers such as idlers 130 can be used to assure good drive connections for the belts, and drive connections 132, 134 are similarly provided from shaft 80-4 to shaft 80-5 and from shaft 80-5 to shaft 80-6.

All drive connections between the shafts 80-1 through 80-6 that carry the advancing rollers can be essentially the same, inasmuch as all these shafts rotate in the same direction, but a clutch-brake assembly is shown on only one of these shafts. Feed rollers 66 rotate in a direction opposite to that of the advancing rollers and timing belt 122 is provided with timing teeth on its external face as well as on its internal face so that the external teeth engage the correspondingly toothed hub of pulley 126 while the internal teeth engage the toothed hub of pulley 124. For better drive engagement between belt 122 and pulley 126 the belt can be arranged to partially encircle the pulley as shown in FIG. 2A, by the use of appropriately positioned idler pulleys 136, 137.

An electrically opened clutch 140 transmits driving power from pulley 126 to shaft 68 so that the shaft is readily stopped to effect the sheet spacing referred to above. The clutch can be arranged so that it permits a little slippage when there is an obstruction or the like in the feed supply. This reduces the possibility of damaging the papers or creating a paper jam.

As more clearly shown in FIG. 1, a pair of receiving trays 141, 142 are positioned at the far end 49 of bed 42 to receive the sheets after they have been advanced the entire length of the bed. The receiving trays are downwardly inclined away from the exit end of the bed so that the sheets slide down to the lower ends of the trays and collect there one above the other as they come off the bed. A selector plate 144 is pivoted at 145 on a bar 147 spaced from the bed end 49, and arranged to be tilted as by kickout solenoid 146 between upper and lower positions in the first of which it permits an exiting sheet to drop into lower tray 142, and in the second of which it directs an exiting sheet into the upper or kickout tray 141.

Reading head 86 is mounted over an intermediate portion of the bed, and contains a fiber optic line-to-circle converter more fully illustrated in FIGS. 7, 8 and 10, for reading marks on the sheets as they advance on the bed under the head. The head also carries a pair of simple photoelectric detectors 149, 150 shown as operating through fiber optic viewers 151, 152, in the upper portion of the head, from which viewers light-transmitting fibers extend to the lower portion at locations 161, 162 spaced along the sheet advancing path.

Another photocell detector 155 is fixed to the side wall 72 just over the edge of bed 42 at a distance from the feed fingers slightly longer than the length of a sheet. This detector responds to the presence of a sheet under it.

A further photocell detector 157 is mounted just below feed plate 48 and responds to the presence of a sheet in feed position in the supply holder 46.

For better operation of photocell detectors, the upper surface of bed 42 is black, as by having the bed made of aluminum that has its upper surface black anodized at the locations of those detectors, and the interior surface of feed plate 50 is also black. The black surface can be confined to a localized portion of the feed plate if desired, as shown at 158 for instance. For added simplicity and effectiveness detectors 155 and 157 can each by equipped with its own source of illumination, as by using photocells of miniature size such as Photodarlington type SD-2410-3 that have their own light-emitting diode generators that generate infrared radiation to which the photocells are highly sensitive. The diodes are shielded from the photocells so that the radiation emitted by the diodes has to be reflected from the surface of the sheet before it finds its way into the cells.

FIG. 11 shows in full scale a sheet which the apparatus of the present invention reads for marks such as made by a conventional pencil. The sheet is white paper, suitably imprinted with marking blocks in blue dye ink. Colors in the paper are to be avoided, particularly those having significant absorption in the near infrared, 800 to 900 nanometers for example, where the photocells show their best response in that range.

Reading head 86 is shown as generally in the form of a box containing the optical fibers potted in plastic. The box can be built around a length of L-shaped rigid angle 400 held against an assembly of bars 402, 404, 406 to partially define the outlines of the box. Thus pieces can be clamped together and the potting effected with an adhesive potting material such as epoxy resin, to firmly secure all parts together, thus permitting the clamps to be removed. The lines of fibers 410 and 411 have their lower ends gripped between bars 404, 406 by the clamping. The opposite ends of the fibers are suitably disposed in the interior of the box and arranged to terminate in the desired locations. The fibers 410 in the line-to-circle converter have their opposite ends 420 held in a generally circular array between mounting rings 416, 417 to define about 300° of a circle, the remainder of the circle being a filler strip 418. Rings 416, 417 can be shaped as by premolding to the desired conformation and have their mating surfaces tapered slightly but to the same degree so they can be tightly fitted against the fiber ends 420. Ring 416 can also be integral with a hub 430 which receives one or more bearings 432 for rotationally mounting timing drum 168.

The fibers 411 are run to light sources 441, 442, 443 which are threadedly engaged in sockets 451, 452, 453 having their lower ends securely held in slots 461, 462, 463 in the upper flange of angle 400. Additional sets of optical fibers 412, 413 communicate light from some of the light sources to the locations 161, 162 from which still further sets of optical fibers 414, 415 run to viewers 151, 152.

Position locations 161, 162 are fitted in slots 163, 164 in bars 402, 406, after which the remainder of the slots are filled with filler strips 438, 439. A similar slot and filler construction is used to locate the upper ends of the fibers for optic viewers 151, 152 in a single slot 448 in the upper flange of angle 400.

All of the foregoing components are assembled in the described location before the potting. In addition threaded sockets can also be securely fitted in angle 400 to later receive supporting posts 439 at the top of head 86 and supporting posts 456 on the depending flange of angle 400.

Timing drum 168 is hollow and is rotatably carried adjacent the generally circularly disposed fiber ends 420 by a drum wall 458 fixed to an axle 459 fitted through bearings 432 and projecting though, and beyond the opposite face of, head 86. To the thus projecting portion is fixed a pulley 460 linked by a drive belt 192 from a drive pulley 194 geared to drive pulley 88 through gearbox 90. Axle 459 is hollow and through it is fitted the shank 467 of a J-piece 468 whose curved end 469 is received in an opening 470 in drum wall 458, where it is held by adjustably eccentric rubber bushing 471 aligned with the circular fiber ends 420. A similarly adjustable eccentric bushing mounting can be provided for the opposite end 467 of the J-piece.

The J-piece is an assembly of light-transmitting fibers held in the desired shape as by a metal sheath through which they are threaded. A set of long fibers can for example be fused together at one zone and the fused portion drawn out to provide a tapering tail which can be inserted through a straight metal or plastic tube into which the set of fibers is to be closely fitted. The tube can be heated to expand it, and the fibers then pulled into place, after which the tube can be bent into the J-shape. The ends of the tube are then cut off, along with the fiber ends projecting from them, to complete the J-piece. The curve in it locks the fibers in place, but if desired a little uncured cement can be applied at one or more locations of the fiber assembly to help secure the fibers after curing.

J-piece end 467 is located immediately adjacent to and facing a photocell 475 fixed to a printed circuit board 476 mounted on posts 456. That photocell accordingly receives through the J-piece the light transmitted to the circularly arranged fiber end 420 from the fiber ends 410, which light is reflected from the surface of the sheet 480 passing under head 86. Rotation of drum 168 effectively causes the stationary photocell 475 to scan the circularly arranged fiber ends, thus scanning transversely across that sheet.

As shown somewhat distorted in FIG. 3, the head is positioned at a very small angle with respect to the transverse to permit uninterrupted line-by-line scanning of the sheet without interrupting the movement of the sheet along bed 42. The small angle corresponds to the distance the sheet moves along the bed while the drum carries the J-piece end 469 from one limit of the circularly arranged fiber ends 420 to the other.

To guard against mark reading difficulties should the sheet buckle or curl up against the fiber ends 410, 411 at the lower face of the head and thus prevent proper illumination of the scanning sight, that face of the head is provided with a transparent spacer 478. A glass spacer about 40 to about 50 mils thick, does a very good job of assuring proper illumination and mark reading. With such a spacer the head can be arranged to provide a paper-receiving gap only about 60 mils deep between that spacer and bed 42.

The illuminating optics can also be incorporated in a separate structure that is not an integral portion of the scanning optics structure. Thus reading head 86 can contain scanning fibers whose lower ends terminate at the bottom of the head near its front face, and a separate set of illuminating fibers can be molded in an illuminating block that carries illuminating lamps and is bolted to the front face of the head.

As shown in FIG. 8 a second printed circuit board 479 is mounted on posts 439 and holds photo detectors 149, 150 in close facing position against viewers 151, 152. It also holds a group of photo detectors 321, 322, 323 and 324 which respond respectively to four rows of timing marks 481, 482, 483 and 484, on the periphery of drum 168.

The entire sheet handling in the illustrated apparatus is under the control of a set of control switches 171, 172, 173 mounted on a control panel 160 on the outside of the housing. They actuate the motor 92, control an energizing circuit for the feed shaft, energize clutch 105 so that it engages, and de-energize brake 107 so that it is released. A stack of sheets is placed in the feed holder after pulling out slidable plate 50, and the plate is then released so that it presses the stack against fixed feed plate 48.

All of the rollers are normally rotating at this time, and the first sheet of the stack is pulled by the feed rollers 66 past the fingers 60 and propelled onto the start end 47 of the bed 42. After a short distance of travel along the bed, the leading edge of the sheet reaches the upper edge of roller 74, is then gripped between that edge and the gripping roller above it so that it continues to be propelled along the bed and at the same time is guided under the shoulder 71 of side wall 72. Further advance of the sheet brings it similarly into the grip of roller 75 and shortly after that the trailing edge of the sheet emerges from the feed fingers 60. The sheet is now completely disengaged from the feed and after this disengagement its leading edge reaches a position under photoelectric detector 155. At this time a pulse of current is generated by the detector and this pulse is arranged to momentarily disengage clutch 140 and thus cause feed shaft 68 to stop its rotation for a fraction of a second. This stoppage does not affect the movement of the sheet under photoelectric detector 155 and that sheet continues to advance. However the feed stoppage is such that it delays the expulsion of the next sheet from the feeder by an amount sufficient to provide a gap or space of about an inch or so between the previously delivered sheet and the next one.

The continued advance of the previously delivered sheet brings its leading edge to location 161 where its presence is detected through viewer 151. This develops a current pulse which causes momentary deactivation of clutch 105 with simultaneous, momentary activation of brake 107. As a result the sheet pauses as it is about to begin its movement through the scanning sight under head 86. This pause enables synchronizing the movement of the sheet with the line-by-line transverse scanning. The scanning is preferably arranged to proceed repeatedly at a substantially constant rate and repetition, and at the appropriate point in a scanning traverse clutch 105 is re-energized, brake 107 being simultaneously de-energized. This is timed so that paper which had been held paused is again driven by rollers 75 and 76 and reaches the scanning sight in synchronism with a scanning traverse.

As shown above the scanning is by rotation of a drum 168 which scans across the circular end of the line-to-circle converter, being driven by pulley 194 geared to pulley 88 through the gearbox 90. This geared interconnection keeps the scanning traverses across the advancing sheet in synchronism with the advancement. In this way the entire sheet has each of its lines scanned, and without stopping emerges from the reading head for continued movement toward the receiving trays.

To double-check on the synchronism, photoelectric viewer 152 is used. A set of three timing pulses is generated at the commencement of what should be the last scanning traverse across the sheet, and these pulses are supplied to a kickout logic circuit. The last traverse is selected by electrically counting the number of traverses beginning with the re-energization of clutch 105.

One of the sync-checking pulses times out shortly after the completion of the traverse with which it was initiated. Another of the sync-checking pulses times out after the completion of the next traverse. The third sync-checking pulse times out after a sufficient number of traverses to complete the scanning of the next sheet being advanced along bed 42.

The termination of the first sync-checking pulse takes place one line beyond the last scanned line and the sheet has a trailing edge margin which is normally under location 162 at that time. If the photoelectric detector does not see a sheet at that moment the kickout solenoid 146 is actuated to direct the sheet being scanned into tray 142, and the sheet is also stamped with a code designation by a printer 170 to indicate that there has been a feed error.

The termination of the second pulse takes place after the trailing edge of the sheet has moved beyond location 162 and the photoelectric detector at this location normally does not see a sheet at that time. If it does see a sheet then, the printer also prints the feed error designation, and the kickout solenoid is actuated to direct the completed sheet to the upper tray. The presence of a sheet at location 102 at that time is caused by a double- or multiple-feed of sheets, one sheet partially overlying another, or by delay in the moving of a scan sheet, and in either event the feeding can be permitted to continue thus removing the improperly located sheets. The sheets bearing the feed error designation are kicked out and can be replaced in the supply stack for re-reading.

Another feed control that can be used is to trigger a pulse from a one-shot pulse generator when detector 155 first sees a sheet, the pulse timing out when that sheet is supposed to reach detector 151. Failure of the detector 151 to see a sheet at that time indicates a jam, and causes the clutch-brake 105, 107 to be operated to stop the rollers 76, 75, 74 and 68 and hold them stopped until the jam is cleared by an operator. A similar jam detection can be arranged by triggering a similar pulse when a sheet reaches detector 151 so that it times out when that sheet is supposed to reach detector 152.

A still further jam detector can be arranged by having detector 155 stop the feed if several seconds elapse without its seeing a sheet.

As illustrated in FIGS. 1 and 1A the housing 40 also carries a display panel 85 on which a number of illuminated displays can be electrically actuated, and one such display is the word "FEED" which is automatically lighted to alert an operator when there has been a feed error such as described above.

The termination of the third sync-checking pulse takes place after the next sheet has passed beyond location 162 and also shows feeding problems if at that moment a sheet is detected in that location. A similar feed-arresting action can then be effected.

A proper synchronization between the scan traverses and the sheet movement depends on a highly reproducible initiation of the driving of the advancing rollers 75 and 76 after the sheet is caused to pause at location 161. The apparatus of the present invention effects very good synchronization by combining a number of features. First there is an immediate operation of the clutch 105-brake 107 assembly to open the drive connection and arrest the roller rotation. Then a time lapse of at least about 0.05 second, preferably at least 0.06 second, is provided to assure that the sheet actually comes to a halt. After that the clutch 105-brake 107 assembly is promptly restored to drive condition so that it remains in open (non-drive) condition for less than about 0.1 second. This is such a rapid stop-start sequence that the movable plate 190 of the clutch does not have sufficient opportunity to shift any significant distance away from its engaged position before it is energized back to that engaged position. As a result that plate undergoes very little shifting, and time variations due to variations in the length of shifting travel are greatly reduced.

Such time variations are even further reduced by having the clutch plate carried by springs that flex, rather than having it slide. The hysteresis in the spring flexing appears to also help reduce the plate shifting amplitude possible in 0.1 second.

Arranging for the scanning traverses to take place about 30 to about 35 times per second with the sheet synchronizing pause 2 to 3 scans long makes a very effective synchronizing system.

Another feature of the synchronizing of the present invention is the initiation of clutch and brake actuation with current pulses at voltages substantially greater than the currents used to hold them actuated. Thus both clutch and brake can be rated for 12 volt operation, and the arresting of the advancing rollers effected by a 24-volt pulse to the brake coil as the clutch is de-energized. This 24-volt pulse need not have a duration longer than a few milliseconds after which the brake energization voltage can be reduced to 12 and maintained at that level until the clutch is re-energized. This re-energization of the clutch can also be initiated with a 24-volt pulse of current for a few milliseconds, following which that current has its voltage reduced to 12.

The foregoing electrical operation is illustrated in FIG. 14, where the electrical windings for the clutch and brake are shown at 201 and 203 respectively. Each of these windings has one terminal 205, 207, connected to a plus 24-volt terminal of a power source whose negative terminal is grounded. The other terminals 209, 211 of the respective windings are connected to electronic grounding means that includes controllable transistor grounding stages 213, 214, 215, 216 and voltage-dropping resistors 225 and 227. The grounding stages are controlled by nand gates 221, 223, 229 and 231. A signal produced by photocell 151 in response to the leading edge of a sheet lowers the output of a voltage generator 204 and this lowering is integrated into a pulse by amplifier 206 that triggers one-shot generator 241 to generate a short control pulse that grounds stage 215 thus actuating brake winding 203 with the full 24 volts. The short control pulse also disables gates 221, 229 to thus unground clutch winding 201. The pulse output of generator 241 is only a few milliseconds long so that the ground connection through gate 223 is only momentary. However the output of voltage generator 204 is low as long as photocell 151 sees the paper, and this is inverted by amplifier 208 to a high level signal directly applied through lead 239 to turn on gate 231 and ground the remote end of resistor 227 through stage 216. This grounds terminal 211 of the brake winding 203 through resistor 227 effectively keeps the brake winding energized at about 12-volt level which is sufficient to keep the stopped sheet from advancing. This braking continues for a while inasmuch as photocell 151 continues to see the stopped sheet.

The clutch gates 221, 229 turned off by the foregoing pulse from the one-shot generator 241, are kept from turning on so long as the output of voltage generator 204 is at a low level.

The initial photocell pulse also triggers a counter that counts two revolutions of scanning drum 168 and then starts a vernier counter that counts a pre-determined number of answer marking positions, as needed to synchronize the sheet re-start with the scanning. At the appropriate vernier count the output of the voltage generator 204 is raised to the high level, triggering one-shot generator 243 to generate a very short control pulse that opens gate 221, and also disables gates 223 and 231. Through opened gate 221 this control pulse actuates the clutch winding for a momentary 24-volt energization by grounding through stage 213, while brake winding 203 is de-energized by ungrounding when gates 223 and 231 are disabled. The stopped sheet is accordingly restarted. After the momentary 24-volt operation of the clutch winding, it continues in operation at an effective energization of about 12 volts, by grounding of the far end of resistor 225 through opening of nand gate 229 which is supplied with the high voltage being then delivered by voltage generator 204.

Another feature that helps with the synchronization is to have the clutch and/or brake operated at 50% or less of rated torque, preferably at not over 25% of rated torque. This clutch-brake assembly rated at 60 inch-pounds can be used with a 10 inch-pound feed to further sharpen the mechanical start and stop action. Such derating also helps reduce the electrical energy requirements for the clutch-brake assembly, particularly that of its clutch which can be energized for long periods of time and thus generate substantial heat. To this end a 24-volt clutch can be shifted to engaged condition as above described by a 24-volt pulse and then held engaged by 12-volt current. Because of the mechanical derating the 12-volt current provides ample energization, yet it sharply reduces the power consumption and heat generation.

FIG. 3A illustrates a type of clutch sold by Formsprag Company and suitable for highly reproducible feed synchronization according to the present invention. An annularly shaped magnetic coil holder 250 receives an energizing coil 252 that can be potted in place, and has a securing ear 254 by which the holder 250 can be fixed to a support to keep the holder from rotation around shaft 80-3. The central portion of the holder provides a passageway wide enough for receiving shaft 80-3 as well as the shank 256 of a clutch plate 258.

A rotary bearing such as the ball bearing indicated, is fitted between the coil holder and the clutch plate shank permitting the clutch plate to freely rotate with respect to the holder. The clutch plate is built up of a rim ring 260 securely held by a friction disc 262 around but spaced from the shank 256 and the shank is secured to shaft 80-3 as by the set screw shown. The rim ring and shank are both magnetic, but the friction disc is non-magnetic.

The coil holder 250 and clutch disc 258 form one unit of the clutch assembly. The remainder of the assembly is constituted by a suitably mounted hub 264 integrally formed with a flange 266 which carries a disc-shaped magnetic clutch armature 268. This armature shifts toward the clutch plate 258 under the influence of the magnetic field generated by coil 252, but the armature is mechanically biased away from the clutch plate by a sinuous spring annulus 270 located along the margin of flange 266.

Spring 270 carries a set of alternating studs 271, 272 alternate ones of which extend through apertures in the flange and secure the spring to the armature, the intervening studs being secured to the flange itself.

Hub 264 is arranged to freely rotate around shaft 80-3, as by means of a sleeve bearing 276 journaled within the hub and rotatable with respect to the shaft. A shoulder 278 can be provided on the end of sleeve 276 to keep the hub appropriately spaced from the clutch disc. A separate collar 280 can be fastened to the shaft to keep the hub from moving away from the clutch disc, and a drive pulley 101 is secured to the hub.

The signals produced by the data photocell are used pursuant to the present invention to provide considerable information about the marks appearing on the marked sheets. Before deriving such information it has been found very helpful to compensate for problems introduced by the line-to-circle converter.

The optic fibers that effect the conversion are difficult to assemble in completely uniform rows and circles so that defects are frequently found in the light transmission in localized portions. If these defects are not serious they can be compensated for as by varying the gain of the signals at those locations when the output of the photocell is amplified.

Additionally the "circle" end of the line-to-circle converter of the present invention is not a complete circle and at least 5 to 10% of the circle is a non-reflective gap that seems to have a deleterious effect on the response of the scanning photocell. That response disappears when the photocell moves along the gap, and it then seems to take a couple of milliseconds or so for the response to build up to the level maintained during the scanning of the fibers in the latter portion of the arcuate travel. This drop-off in response is reproduced quite faithfully at each revolution of the scanning head and can also be compensated by adjustment of the amplification. Alternatively the scanning system can be made to scan a length longer than the length of the lines being scanned, and the first portion of each scanning length can be left unused. For this purpose the rows of fibers 410, 411 can be made about ½ inch longer than the width of the sheet that is devoted to marking, and the first ½ inch of the scan stroke gated off. Also the circular fiber array 420 can be made a little longer proportion of a complete circle, 310° for instance. The fiber optic arrays frequently contain defects in the last few fibers at each end of the array, and it is helpful to have these arrays made longer than needed, so that the portions used can be confined to those fibers that show the least defects.

FIG. 13 shows the overall electronic combination of the present invention. The output of the data photocell 475 is amplified in data amplifier 300 to bring it to a more convenient level, and then delivered to controllable gain amplifier 302. The gain of amplifier 302 is controlled by a gain-change circuit 304 which is triggered by signals from selected output terminals 306 of a shift register 308 which in turn is pulsed by a clock logic circuit 310 that delivers pulses corresponding to the successive position along a scanning line at which marks to be read may appear. Or gate 312 is connected to the particular shift register output or outputs at which a compensating gain change is desired, as determined by inspection and test operating the reading head 86. The compensation need not be perfect and an output variation of ±10% in signal strength along a mark-free scan path is perfectly acceptable. The entire gain compensation circuit can be omitted or by-passed when the flaws in the fiber transmission are minor and where the extra wide scanning fiber array feature is used.

The clock logic circuit is shown with a number of different inputs receiving clock signals from the separate photocells 321, 322, 323, 324, that indicate the instantaneous transverse positions of the scanning traverses. Photocell 321 is positioned to only respond to the S or start bar in timing row 481, when a scanning traverse begins. Photocells 322, 323 and 324 respond to bars that show different sets of successive individual locations along a scan traverse when the scan is in a position at which individual marks on the sheet being scanned are to be detected. By using three different sets of individual position clock bars the apparatus can be used with sheets having three different marking patterns. Fewer or larger numbers of marking patterns can be processed by correspondingly varying the number of individual clock rows and photocells.

In the illustrated apparatus photocell 322 is designated HI inasmuch as it is used with the highest marking density or marks per line; photocell 323 is designated LO and is used for the lowest marking density or marks per line, while photocell 324 designated PLC (which stands for print line compatible) is used with an intermediate marking density or marks per line corresponding to the spacing of standard computer printouts. A manually settable clock selector 326 selects the particular clock signal to supply to the grading and scoring circuits. However, the photocell compensation is desirably effected with the HI clock signals as shown, regardless of which clock is used in the scanning.

S signals are also derived from the clock logic circuit 310 and used for various synchronizing functions, including the sync initiation and checking described above.

The gain change for the controllable gain amplifier 302 can be of fixed proportion if desired, as by switching a resistor in and out of bridging relation with respect to an input resistor or a gain-determining feedback resistor of an operational amplifier. The change in gain can be a gain decrease or a gain increase, as required by the character of the signals to which the compensating gain is to be applied.

Figure 12:
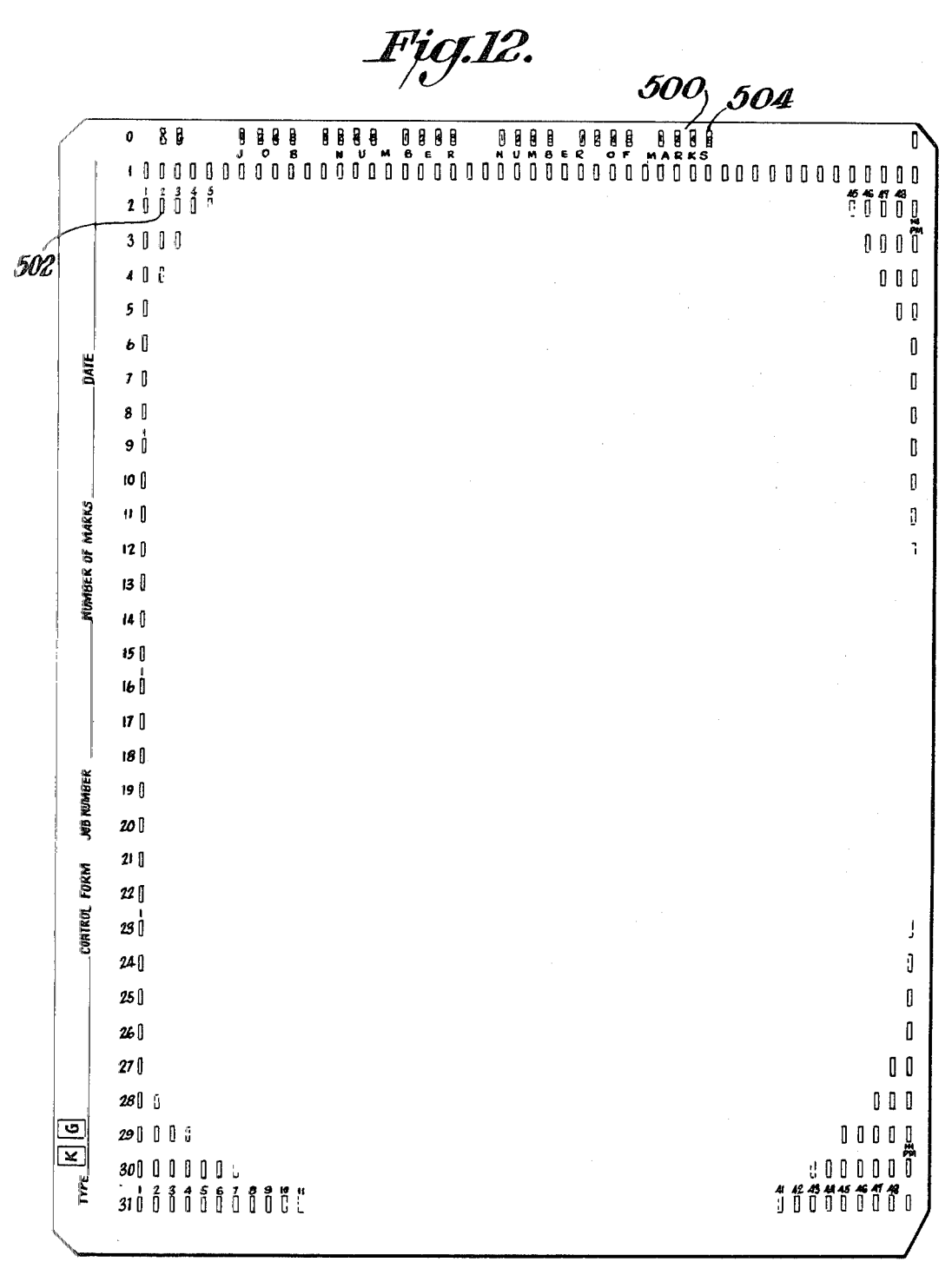

The output data from controllable gain amplifier 302 is supplied to three different final amplifiers 331,332,333. Final amplifier 331 is a relatively weak amplifier used to deliver the data signals derived from load or control sheets to a load logic circuit 340 which is switched on by means of load switch 341 on panel 160. The load sheets are those used to prepare the apparatus for grading and scoring examination or tests sheets, and FIG. 12 shows one form of load sheet 500 pursuant to the present invention.

Sheet 500 is imprinted with a pattern of marking blocks 502, on selected blocks of which there is marked by vertical pencil lines the information which is to be used by the scanner for determining where test questions begin, where they end, and whether the marks on a test sheet are for a single test or for a group of tests each to be separately scored, and also to determine whether there are present such markings that can be used to identify the load sheet. In addition load sheet 500 has a top row of blocks 504 for additional markings that help with the use of the apparatus. A load sheet marked as above noted is designated a grid or G sheet.

An additional load sheet is generally used to show the correct answers to each question, and such load sheet is designated a key or K sheet.

Blocks 504 are marked to show whether the sheet so marked is a K sheet or a G sheet, by penciling in the block carrying the appropriate printed designation, and also can have a test number marked in binary code in a row of 12 blocks reserved for that purpose and imprinted with a binary legend. A second set of 12 binary bode blocks can be used to show the total number of marks applied to the block pattern 502 and thus act as a safety check. To this end load circuit 340 has a disabling output 342 which is connected to disable the feed or supply roller shaft 68 and to flash a reload indicator on panel 85, if the number of marks on the load sheet does not correspond with the designated number appearing in row 504. The printer can also be arranged to print on such kicked out load sheet a code symbol to indicate the miscount. A similar feed disabling is effected if the two load sheets needed for grading and scoring a test sheet show different test numbers or are both K sheets or are both G sheets. Accordingly the processing and acceptance of two load sheets without having the feed shut itself off will be a safe indication that the apparatus is properly prepared for grading and scoring. The scan indicator on panel 85 can also be lit when a proper pair of G and K sheets has been processed. The G and K sheets also trip the kick-out solenoid so that these sheets are separated from the answered sheets.

FIG. 13 shows a grid memory 344 to which the grid marking information is supplied and stored, and a similar key memory 346 to which the correct answers are supplied for storage. The load signals are also delivered to a logic circuit which in turn develops signals showing (a) the scanning of the identification portion of the test sheet, (b) the scanning of the test portion of the sheet, (c) alpha-marks denoting the beginning of each test question, (d) part mark signals showing the end of every portion of the examination that is to be individually corrected and scored, (e) last part signals indicating the point at which all the questions end, as well as (f) right-answer key signals.

Amplifier 332 is a dark mark amplifier having a gain substantially greater than that of load amplifier 331, to better detect the presence of marks on a test sheet. Such marks can be much fainter than the marks applied to the load sheets, the latter marks being applied by an operator rather than an examinee. Also marks applied by an examinee are frequently erased, sometimes inadequately so that multiple markings are detected for the answer to a single question for which only a single mark is appropriate. It also can happen that an examinee intentionally or unintentionally applied two different marks in answering such a question.

Dark mark amplifier 332 receives the data signals in the form of spaced pulses indicating the marks detected by the scanning. It also receives signals from the grid memory to show the termination of each test question. The output of the dark mark amplifier is delivered to a decision logic circuit 360 and to a page memory system. For convenience this memory system can be divided into a main line memory 371 and an aux line memory 372, a flip-flop type alternater 374 being suitable for switching alternate lines of data to the respective memories. The aux line memory can thus be solely for identification data, as with test sheets which have test portions in which the test markings are on alternate scanning lines. The marking of the identification portion of a test sheet is generally crowded together on successive lines, as shown by the identification portion 602 and test portion 604 test sheet 600 in FIG. 11. In order to have the scanning automatically provide the identification data associated with each test sheet, the identification portion 602 of the test sheet has block designations and instructions for the application of marks to indicate such things as the student's name, number, grade, birthday, sex, as well as type and time of test. As indicated above, all this identification material is crowded together in successive lines spaced apart the same distance as successive scan lines.

The test portion 604 of the test sheet has designations for the marking of answers to test questions, and these designations are shown on alternate scanning lines so that they are twice as far apart as the lines shown in the identification portion 602. However the spacing between identification lines can be made the same as between test marking lines, and both can have the close spacing of portion 602, or the wider spacing of portion 604. Also the test portion is shown as subdivided into a plurality of groups of designations 605, 606, 607, each of which can constitute a separate test and can be separately graded and scored.

Figure 15:
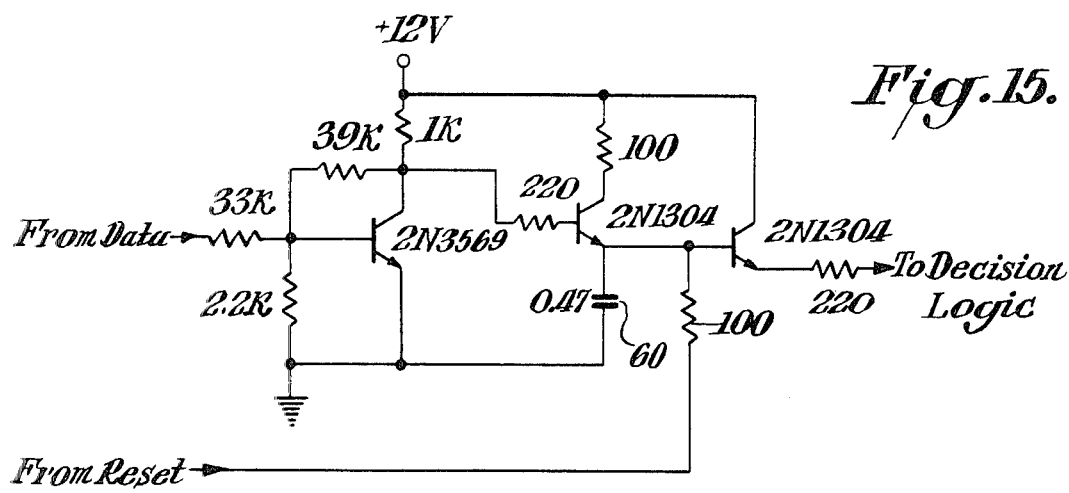
FIG. 15 is a circuit diagram of a circuit stage suitable for use in the present invention.

The dark mark amplifier is arranged to deliver an output signal corresponding to the darkest mark applied in answer to a question. Such selection is readily effected by including in this amplifier a stage which is connected to supply charging current to a capacitor each time a data pulse corresponding to a mark is being amplified. The capacitor is of sufficient capacitance that it does not charge up to maximum voltage unless the data pulse is a very strong one. Such a stage is illustrated in FIG. 15.

In this type of arrangement the first data pulse, if weak, will cause the capacitor 609 to charge up to a relatively low voltage, and succeeding data pulses will increase that charge voltage only if the succeeding pulses are at a higher voltage. The capacitor will accordingly receive its last charge increment from the strongest pulse. Each pulse is recorded in the page memory, with the strongest pulse recorded as the last pulse for any one question. The grid signal indicating the end of a question is then arranged to discharge the charged up capacitor so that it is ready for the next question.

At the completion of each scanning line an edit signal is applied from edit circuits 381, 382 to the stored memory for each question in that line, to read the memory record for each question and to do so in reverse order. This reverse readback for each question terminates when it reads the record of any mark, and this is a record of the darkest answer mark. The edit signal also erases all recordings in the line being edited, and re-records for each question in that line the darkest mark record as the only answer to that question.

The foregoing editing can be eliminated when it is desired to show all answer markings for any question.

Normal amplifier 333 is also used to deliver data signals along with the data signal output of dark mark amplifier. Amplifier 333 has a gain intermediate between the gains of amplifiers 331 and 332, and delivers to decision logic circuit 360 its data output signals, which correspond to every answer mark even though the mark be smudged or of low blackness. The 333 output signals are used to determine when there are multiple answers, and help in the reading of the darkest mark signal by supplying a relatively strong pulse where the darkest mark might itself supply from amplifier 332 a relatively weak pulse because a previous answer mark for that question was only slightly lighter.

Decision logic circuit 360 is shown as receiving many other inputs and supplying a plurality of output signals such as (a) Missing id (identification). This can be set to show that key information like the student's name has not been marked in the identification section of the test sheet, or has not been properly marked as for example the marking of only a single letter for a last name.

(b) Multiple. This shows that more than one dark answer mark has been applied for a question and only one of them is a correct answer.

(c) Omit. This shows that no mark has been made for a question (d) Wrong answer.

(e) Right answer.

Accumulators are connected to receive the Omit, Wrong answer and Right answer signals, and to separately add them for scoring purposes as well as to display the accumulated totals on display panel 86.

Switches 391, 393 are provided along with a kickout logic circuit 395 to enable, when desired, the kicking-out of sheets having multiple answers, or every sheet having any predetermined number of multiple answers, and/or kicking-out of every sheet with missing identification. As with other kick-outs, the printer is arranged to print on the sheet a designation of the kick-out reason.

A score accumulation and memory system is also provided. A total score accumulator 702 and a part source accumulator 704, each shown as a 12-bit accumulator memory, are each supplied with the right answer signals as well as with the output of a formula logic circuit 706 which receives the wrong answer signals. A formula switch 708 selects a desired scoring formula such as the number of right answers minus the number of wrong answers, or the number of right answers minus ½ the number of wrong answers, or merely the number of right answers. This causes the formula logic circuit to deliver appropriate subtract pulses to both accumulators 702, 704 so that these accumulators total the scores in accordance with the designated scoring formula.

At the end of each separately graded examination portion, the score from part score accumulator 704 is transferred to a score storage logic circuit 712 by a score transfer logic circuit 714 which is in turn supplied with key memory signals, part mark signals and a test signal that indicates the score being accumulated is in a test portion of a scanned sheet.

At the end of a sheet the last part mark signal is actuated to clear the total score accumulator, transferring its contents to the part score accumulator from which it is retransferred to the score storage logic circuit 712.

From the score storage logic circuit the scores are transmitted to buffer memory 720 and to printer memory and logic 722. Operation of printer switch 724 causes the printer to print along a selectable portion of the margin of the test paper, the part score, the total score, or both. The logic portion of circuit 722 encodes the scores for the printer which is shown as a 7-dot matrix printer.

The buffer memory can also be used to store the page memory signals, and this is shown by a page memory transfer logic circuit 730 connected to receive signals from the main and aux page memories, as well as form the transfer and logic circuit 714. All the significant information read by the apparatus can accordingly be retained in the buffer memory even when it is a 256 7-bit memory, as illustrated.

The buffer memory is not needed if the apparatus is only to effect the grading and storing. It is however very useful whenever scores are to be correlated with student identifications or with socres from other students, other classes, schools, etc. For more permanent storage the buffer memory information can be transferred to magnetic tape or the like, and for reading the memory its information can be sent as by data phone to a cathode-ray tube display, printer, computer, or the like.

Figure 13A:
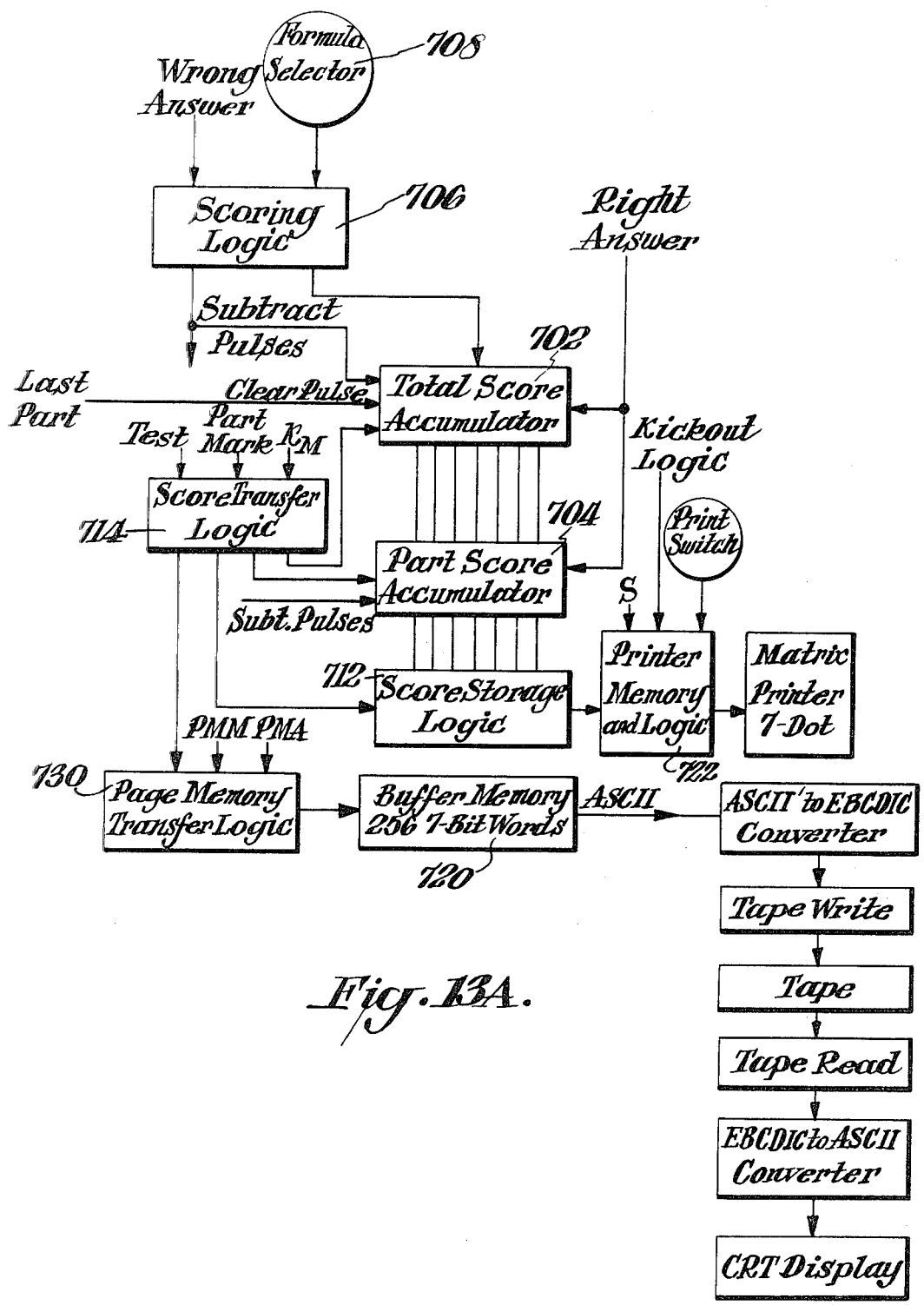

FIG. 13A illustrates the foregoing signal transfers to tape and display. Instead of immediately sending the memory information to both tape and display, the information is first encoded for tape and sent to the tape recording circuits which cause it to be recorded on the tape, and the thus-recorded signals immediately played back, recoded for display and sent to display. This sequence of operations takes much less time than sending the buffer memory signals directly to the tape and also directly to the display, an operation that requires two different encodings of the buffer output. Without a further storage memory it is not practical to effect both encodings of the buffer output at the same time, so that one encoding would then wait until the other encoding is completed. The faster sequence of the present invention accordingly reduces the danger of having a grading and scoring system blocked by unavailability of its buffer memory, and makes it easier to transmit the output of a plurality of graders and scorers to a single tape.

The printing by printer 170 is applied to a test sheet after that sheet has been completely scanned and is not to be kicked out. In this way it is assured that the scanning is not disturbed by the mechanical effects of the printing, and that multiple printing does not take place. FIG. 2 shows a suitable form of printer having a seven-dot printing hammer assembly 169 mounted under bed 42 with its hammers arranged to strike upwardly through a slot in the bed against an inked ribbon 178 that is fed across the bottom of an anvil 167. The sheet on which the printing is applied is located just under the ribbon so that the lower surface of the sheet is struck by the hammers and inked impressions are thus produced on the upper surface of the sheet.

If desired the feeding system of the present invention can be modified by having all sheets provided with a specially cut off top corner. The supply hopper can then have a ridge running along its corresponding corner. This ridge keeps a sheet from dropping to its proper feed position unless the specially cut sheet corner is in proper place. An operator can thus immediately ascertain when some or all of the sheets are not properly inserted in the supply hopper.

The test sheets can also be arranged so that the marking of test answers takes place on every scanning line, rather than every other such line. This shortens the amount of time available for memory edit functions and the like, but this can be compensated for if needed. For example, the scanning speed can be reduced a little, or the circularly arranged fiber ends 120 can be restricted to a smaller portion of an entire circle.

Figure 16:
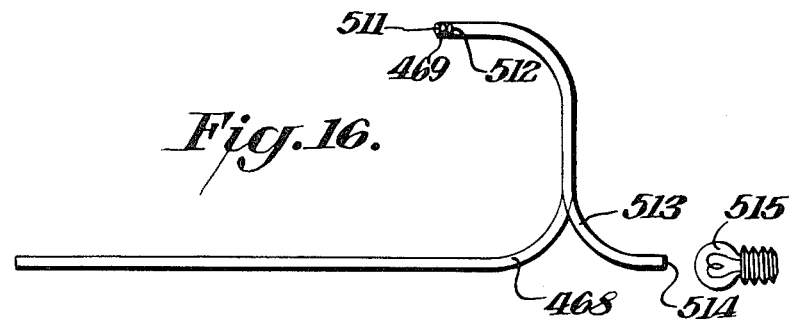
FIG. 16 is a detail view illustrating a modified scanning system in accordance with the present invention.

Another alternative arrangement for the present invention is the provision of reading illumination by means of the J-piece. Such a construction is illustrated in FIG. 16. Here the J-piece has secured to its curved end 469 two more sets of light-transmitting fibers 511, 512 mounted on each side of end 469 so that they face the fiber ends 420 on both sides of the ends from which the J-piece scanning end 469 receives light reflected from a sheet. Sets 511, 512 are cemented or otherwise secured to the J-piece, and extend along the curved portion of the J-piece a little before the two sets branch away from the J-piece and join together to make one illuminating bundle of fibers 513. This bundle has its end 514 disposed at the axis of rotation facing an illuminating bulb 515.

With the arrangement of FIG. 16 illumination is provided by bulb 515 on both sides of the portion of the paper being scanned by the J-piece. This is sufficient illumination for accurate scanning and can be used to supplement or replace the illumination by fibers 411. The use of a single localized light source also helps assure the absence of reading errors that may be caused by light intensity differences from multiple sources such as bulbs 441, 442 and 443.

The light fibers 412,413,414,415 of FIG. 10 can also be omitted and replaced by position detectors such as 155 placed in suitable recesses in the lower face of head 86. A recess can also be provided to receive an elongated lamp such as a fluorescent bulb that directly illuminates the test sheet adjacent to or at the scanning sight. While fluctuation in light output can occur along the length of a fluorescent bulb, such fluctuations generally peter out after the bulb is operated about 30 hours or so.

The circuits of FIGS. 13 and 13A, including those for the various photocells, are preferably in the form of printed circuit boards with integrated circuit components such as operational amplifiers and memories, used wherever appropriate. Aside from having boards with photocell circuits close to the photocells and the clutch-brake circuits close to those components, the balance of the circuit boards can be mounted in an out-of-the-way place such as rack 596. Here the boards can be easily slipped into mounting guides as at 598, and appropriately connected by means of multiconductor cables having sufficient slack so that any of the circuit boards can be pulled out of the rack for examination and testing, without requiring disconnecting that board from the entire circuit. In addition one or more check boards can be used and equipped with number-displaying circuits or the like for those circuit portions that are difficult to test by other techniques. Those circuit portions can accordingly be checked by merely examining the number displays shown on the check board.

For improved accuracy the Grid memory and Key memory can both have their entries counted during the test sheet scanning and the total count thus obtained compared with the initial totals marked on the Grid and Key sheets. These totals were recorded during the loading of the equipment with the Grid and Key sheets. Any deviation of the count obtained during scanning, from the count originally recorded, is then arranged to trigger the kickout mechanism and actuate the printer.

Because of the distance a scanned sheet travels before it reaches the kickout selector plate 144, it is helpful to delay actuating that plate, as for example a predetermined number of revolutions of drum 168 following the completion of the scanning of the sheet. When that predetermined number of revolutions corresponds to the feed required for the scanned sheet to be very close to the selector plate, it only takes a short actuation of that plate into the kickout position to make sure that the sheet drops into kickout tray 142 rather than into tray 141. Each kickout actuation can then be of equal length.

The foregoing mark counting during scanning is a much more desirable check on the operation than a parity check, and can be performed at every scanning line or at every answer part if desired, rather than only once for the entire sheet.

A great deal of automatic reading of answers to different tests can also be effected with a single type of examination answer sheet for instance, in which event a single set of Grid memory entries can be maintained and different Key sheets loaded into the machine each time a set of answer sheets for a different examination is being read. To this end the equipment can be connected so that it receives and loads fresh Key sheets without requiring fresh Grid sheets, as for example when the fresh Key sheets show the same job number as the previously loaded Grid sheet.

Another helpful feature is the provision of a memory cycling read-out, as by providing a suitably connected control button 394 on the instrument control panel, along with read-out lights as indicated at 89 and 91 on the display panel 85. In the event a sheet is kicked out because of an error such as an incorrect mark count, for example, the sheet can be passed through the machine again by itself so that the buffer memory retains all the sheet readings, and then an operator can repeatedly push the memory cycling button 394 noting at each operation of the button the location and contents of the memory thus shown. The error can thus be readily located.

The buffer memory can be connected so that it is only cleared after a few rotations of the scanning head have been completed beyond the scanning zone, as for example upon the termination of the second sync-checking pulse. The memory cycling control 394 can also be connected to stop the feed before this memory clearing action takes place, or to disable that clearing action, so that the memory remains readable.

A counter can also be provided as indicated at 51 in FIG. 5, to provide a count of all the sheets that have been read and not kicked out. This counter can be mechanical so that it is not affected by power interruptions or the like, and can be electrically pulsed each time the buffer memory is cleared or each time the buffer memory contents are satisfactorily transferred to tape or the like. This provides a very accurate count.

A fan 52 can be arranged to help cool the interior of the equipment.

Instead of reading and scoring test answers, the apparatus of the present invention can carry out other chores, such as checking inventory from shipping and receiving sheets, computing payrolls from daily work sheets, as well as other accounting operations, work scheduling, collating salesmen call reports, reading and totalizing questionnaires, etc.

One suitable set of integrated circuit components for the above-described circuits is taken from the collection described in The TTL Data Book for Design Engineers, First Edition, copyright 1973 by Texas Instruments Incorporated. Thus for low voltage operation:

| | | |
|---|---|---|
| nand gates can be | types | 7404 or 7400 |
| and gates | | 7408 |
| flip-flops | | 74S113 |
| one-shot generators | | 74123 |
| shift registers | | 74L164 |
| counters | | 74192 |
| memories | | 74200 |
| or gates | | 7432 |
| comparators | | 74L85 |

Figure 17:
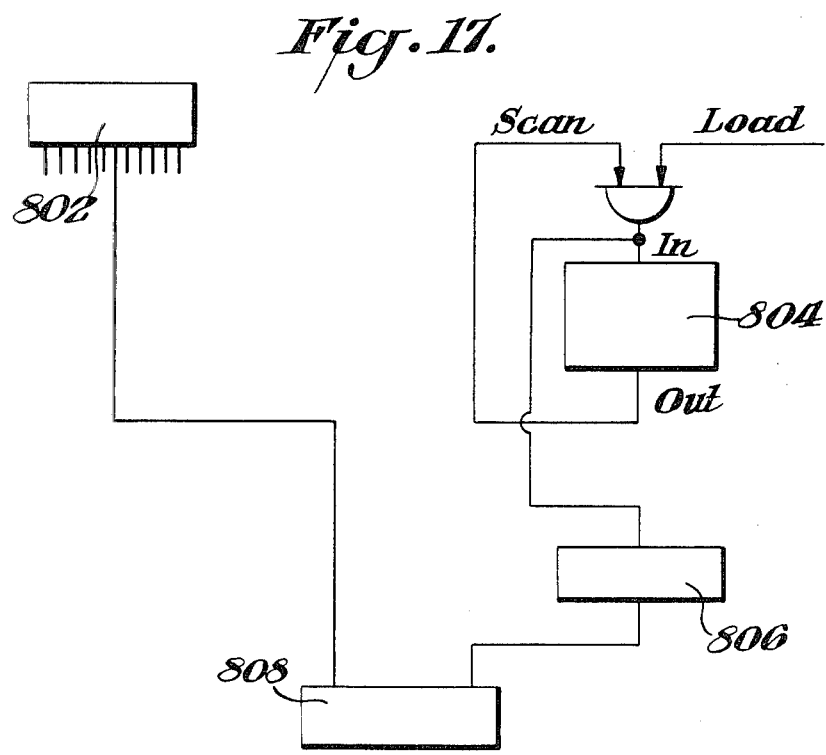
FIG. 17 is a typical comparator circuit pursuant to the present invention.

A typical comparator circuit is shown in FIG. 17. A shift register 802 is connected to receive and store the number of marks coded in the zero line of a G sheet for example. A memory 804 is supplied with all the marks on that G sheet for use in the subsequent scoring, and as it is being so supplied, the number of supplied marks is counted in counter 806. At the end of the loading, the counts in the shift register 802 and in the counter 806 are compared by the comparator 808, and if they are not exactly the same, a reload flip-flop is set causing kickout as well as the lighting of a reload indicator.

A duplicate circuit can also be used for the K memory.

During scanning of answer sheets, the G memory is read out in sequence, and the data read out is fed back to the memory input and also counted in counter 806. At the end of the answer sheet after its scanning is completed, the shift register 802 is again compared with counter 806, to make sure there has been no loss or gain in the memory. This check on memory is made after every answer sheet and is much superior to parity checks.

Some of the electronic operations carried out during the scoring and grading are desirably performed sequentially within the time period between two successive clock pulses in a single scanning line. By way of example the comparison of memory signals as by strobing to determine whether an answer is right or wrong, is desirably completed before the score is pulsed to the score accumulator, and transfers from a memory at times when signals are not being sent to that memory for storage. For this time slot subdivision a series of very short switching pulses, four for example, can be generated at each clock pulse, and the various switching operations carried out by the appropriately selected switch pulse.

Obviously many modifications and variations of the present invention are possible in the light of the above teachings. It is, therefore, to be understood that within the scope of the appended claims the invention may be practiced otherwise than as specifically described.

What is claimed:

1. An automatic sheet reading assembly comprising an elongated bed along which sheets are moved, sheet-transporting means including a powered feed roller adjacent one end of the bed for engaging the end sheet in a sheet supply pack and rotating in one direction to propel that sheet into the bed, the sheet-transporting means also including sheet-spacing means connected to interrupt the actuation of the feed roller after a transported sheet is disengaged from that roller, to keep the next sheet from being transported into the bed until it is spaced from the previous sheet.

2. The combination of claim 1 in which the sheet-transporting means also includes stopping structure containing sensing means connected to interrupt the movement of the sheet along the bed when it reaches a predetermined bed position, and to maintain the interruption at that position at least a predetermined time that assures highly reproducible restarting of stopped sheets in synchronism with the scanning of a sheet-reading head.

3. The combination of claim 2 in which the sheet-transporting means is connected to synchronize the arrival of the sheet at the reading location and to then move the entire sheet without interruption through that location.

* * * * *